Oct. 1, 1963   R. E. PRICE   3,105,404
WORK DRIVER

Filed April 27, 1960   2 Sheets-Sheet 1

R. E. PRICE
INVENTOR

BY *Mason, Porter, Diller & Stewart*

ATTORNEYS

Oct. 1, 1963   R. E. PRICE   3,105,404
WORK DRIVER

Filed April 27, 1960   2 Sheets-Sheet 2

R. E. PRICE
INVENTOR

BY *Mason, Porter, Miller & Stewart*

ATTORNEYS

United States Patent Office 3,105,404
Patented Oct. 1, 1963

3,105,404
WORK DRIVER
Ralph E. Price, Waynesboro, Pa., assignor to Landis Tool Company, Waynesboro, Pa.
Filed Apr. 27, 1960, Ser. No. 25,000
5 Claims. (Cl. 82—40)

The following specification relates to an improved turning work driver for rotary grinders, lathes, and similar machines.

Irregular workpieces when mounted upon the center of a rotating headstock are required to be supported by means which will cause them to rotate with the headstock. It is also important in such devices to arrange them with a minimum of structural parts, but with flexibility for operation under varying conditions.

One of the objects of this invention is to provide a turning work driver which will hold the workpiece and cause it to turn with the faceplate of the headstock.

Another object of the invention is to provide a driver which will yield in its motion relative to the workpiece in the engaging movement and thereafter hold the workpiece firmly for rotation.

A feature of the invention is to provide a work holder which will rotate into position, yielding to receive the workpiece and then holding the latter against relative movement in either direction.

A still further object of the invention is to provide a driver which may move relative to the workpiece in either direction, yielding to the latter until the desired driving position is reached, and thereafter holding the workpiece on both sides.

A still further object of the invention is to provide a work driver which in operative position blocks the front of the workpiece against dislodgment.

Among the objects of the invention is to simplify the structure and reduce the cost of such work drivers.

The above objects will be well understood from the following description of the preferred form of the invention as illustrated for the purpose of example on the accompanying drawings in which.

Figure 1:
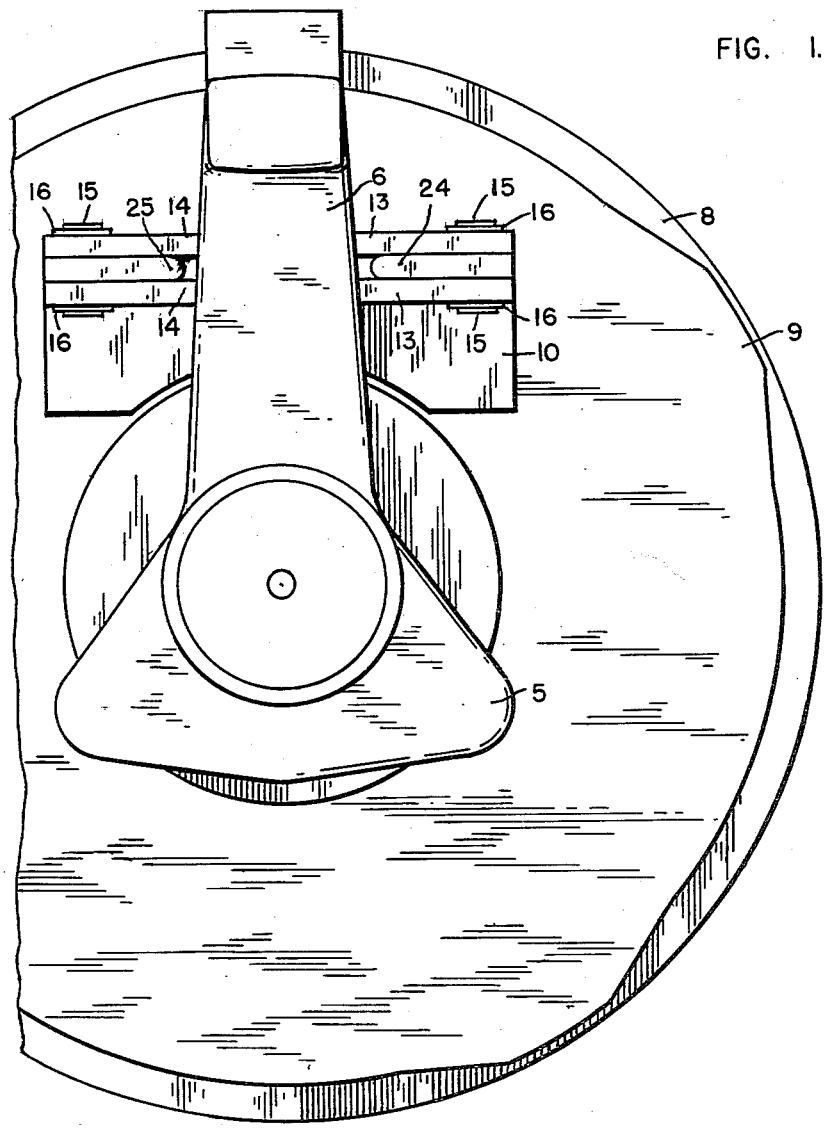
FIG. 1 is a front elevation of the work driver and associated parts.
Figure 2:
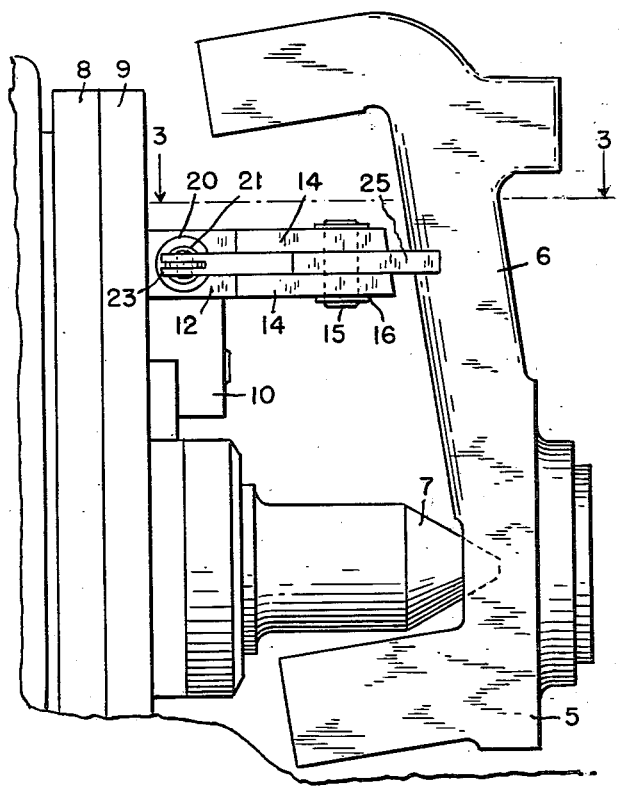
FIG. 2 is a side elevation of the same.

Basically, the work driver is provided on the faceplate of the headstock opposite the projecting part of the workpiece held on the headstock center. The driver is designed so that as it is brought around to engagement with the workpiece, the forward part of the driver is depressed to allow the workpiece to fit into driving position, whereupon the advancing portion of the work driver moves into position in front of the workpiece. The latter is thus held against relative movement both in front and at the rear.

In the form shown in the accompanying drawings, an irregular workpiece 5 having an extended arm 6, is mounted on the center 7 of a rotary headstock 8. This headstock has a faceplate 9.

The faceplate 9 carries a bracket 10 which is bolted in place on one side of the center 7. This bracket has a lateral upstanding extension 12.

The extension 12 projects in opposite directions at right angles to the radius of the faceplate to provide two pairs of bearings 13, 13 and 14, 14. Each bearing carries a transverse pivot pin 15. The pivot pins are held in place by split rings 16, 16.

Levers 17 and 18 are carried on the pivot pins 15, 15.

The rear end of each lever 17, 18 extends down opposite the end faces 19, 19 of the extension 12. The extension 12 at its bottom opposite the rear ends 17 and 18 of the levers is drilled transversely to provide a hole or passageway 20. This passageway accommodates a coil spring 21. The opposite ends of the coil spring 21 are attached by means of pins 22, 22 within slotted ends 23 of the levers 17, 18.

The forward end of the lever 17 terminates in a dog 24, while a dog 25 forms the forward end of the lever 18. Each dog may be depressed in the position shown in dotted lines for the dog 25 on FIG. 3. This is resisted by the spring 21 which moves the dog back into upper position with the rear end 18 of the lever against the end wall 19 of the extension 12. At the same time the spring is anchored by the pin 22 in the rear end of the lever 17 which remains against the corresponding end wall 19 of the extension serving as an abutment.

Figure 3:
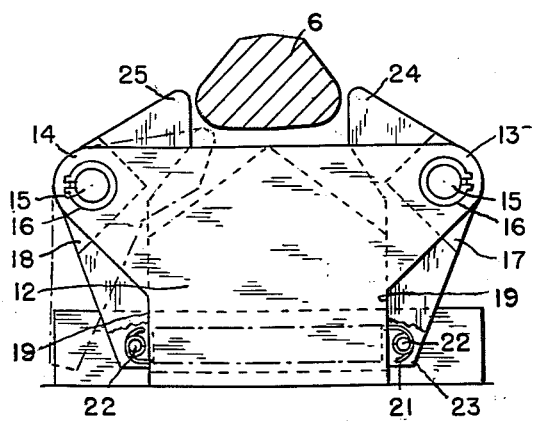
FIG. 3 is a plan view of the driver taken on the line 3—3 of FIG. 2.

The bearings 13, 13 and 14, 14 extend inwardly of the extension 12 to the degree indicated by dotted lines in FIG. 3, and thus permit either dog to move out of the path of the arm 6 of the workpiece.

In extended positions, the dogs 24, 25 stand opposite the sides of the arm 6 close enough to prevent undesirable relative movement of the latter.

It will be readily understood that when the workpiece is mounted upon the center 7 and held between the headstock 8 and the tailstock, not illustrated, the workpiece may be given relative rotary movement. This movement will cause the engagement of the arm 6 with one of the dogs, for example 25. The dog will then be depressed against the force of the spring 21 to permit the arm 6 to occupy the position between the upstanding dog 24 and the dog 25 which is brought into upstanding position by tension of the spring 21.

The arm 6 is therefore constrained to rotate with the work driver in either direction of rotation. The rear ends of the dogs are held by the spring 21 in contact with the ends 19 of the bracket which thus serve as abutments. If one dog, for example 25, is depressed or deflected out of the path of the arm 6, the corresponding free rear end of the lever 18 moves away from that end 19 of the bracket. The spring 21 stretches, but its opposite end being connected to the opposite free end of the lever 17, serves as a fulcrum or anchor.

The bracket 10 may be mounted in any desired position on the faceplate 9. The sole requirement is that it shall present the dogs 24, 25 so that as the bracket rotates past the arm 6, one of the dogs is depressed and then released on the other side of said arm to hold it between the dogs 24 and 25.

The invention has been illustrated by way of example in the preferred form but without limitation to various changes in proportions and minor details within the scope of the appended claims.

What I claim is:

1. In combination with a rotary face plate having a center, a work driver comprising angularly spaced pivot means mounted on said face plate, a lever supported on each of said pivot means, a projecting dog on each said lever opposed to each other and defining a work receiving opening therebetween, and resilient means holding said dogs in upstanding position to said face plate in normal operative position whereby upon rotation of the face plate a workpiece can depress one of said jaws and allow the workpiece to be received in said opening for driving connection.

2. The combination of claim 1 wherein said pivot means is eccentric of said center on said face plate and has circumferentially spaced journal bearings carrying pivots on which said levers are supported, said pivot means further having recesses for receiving said dogs when depressed, and wherein said levers have inclined outer deflecting faces.

3. The combination of claim 1 wherein said pivot means comprises an upstanding bracket located eccentrically of said center on said face plate having circumferentially spaced journal bearings on which said levers are pivoted, wherein rear ends of said levers away from said dogs are freely movable away from said bracket under resilient tension, and said dogs have outer inclined deflecting faces.

4. The combination of claim 2 wherein a pivot member is in each of said bearings and said levers are supported by said pivots.

5. The combination of claim 2 wherein said bracket has a transverse passageway between said bearings with a spring in said passageway attached to the said rear ends of said levers and normally holding said rear ends against sides of said bracket.

References Cited in the file of this patent

UNITED STATES PATENTS

| | | |
|---|---|---|
| 745,977 | Tindel | Dec. 1, 1903 |
| 842,046 | Williams | Jan. 22, 1907 |
| 901,595 | Deems | Oct. 20, 1908 |
| 1,356,628 | Johanson | Oct. 26, 1920 |
| 2,390,976 | Wilcox | Dec. 11, 1945 |
| 2,538,668 | Chrisman | Jan. 16, 1951 |
| 2,943,878 | Rigaud | July 5, 1960 |

FOREIGN PATENTS

| | | |
|---|---|---|
| 9,679 | Great Britain | Apr. 29, 1903 |
| 454,851 | Germany | Jan. 20, 1928 |
| 106,785 | Australia | Feb. 28, 1939 |